United States Patent
Dvorak et al.

[19]

[11] Patent Number: 5,897,176
[45] Date of Patent: Apr. 27, 1999

[54] BRAKING APPARATUS AND METHOD FOR USE WITH A MOVING VEHICLE

[75] Inventors: Paul A. Dvorak, Kewanee, Ill.; Peter R. Hildner, Apex, N.C.; David P. Smith, Joliet, Ill.; William C. Swick, Raleigh, N.C.

[73] Assignee: Caterpillar Inc., Peoria, Ill.

[21] Appl. No.: 08/616,548

[22] Filed: Mar. 15, 1996

[51] Int. Cl.⁶ .................................................. F16D 31/02
[52] U.S. Cl. .......................... 303/151; 303/117.1; 60/436
[58] Field of Search .............................. 60/436, 491, 443, 60/444, 492, 494, 490, 487; 91/505; 303/151, 117.1

[56] References Cited

U.S. PATENT DOCUMENTS

| | | | |
|---|---|---|---|
| 3,561,212 | 2/1971 | Pinkerton et al. | 60/492 |
| 3,988,893 | 11/1976 | Bojas et al. | 60/445 |
| 4,543,786 | 10/1985 | Shuler | 60/436 X |
| 5,020,649 | 6/1991 | Eastcott | 192/48.1 |
| 5,279,122 | 1/1994 | Shirai et al. | 60/452 |
| 5,445,447 | 8/1995 | Farr et al. | 303/117.1 |
| 5,447,029 | 9/1995 | Swick et al. | 60/492 |
| 5,474,371 | 12/1995 | Shinomiya | 303/117.1 |
| 5,509,729 | 4/1996 | Zaviska et al. | 303/117.1 |
| 5,626,403 | 5/1997 | Beck et al. | 303/117.1 |

FOREIGN PATENT DOCUMENTS

| | | |
|---|---|---|
| 0223686 | 5/1987 | European Pat. Off. . |
| 2324480 | 9/1975 | France . |
| 2407846 | 11/1977 | France . |
| 2244748 | 11/1991 | United Kingdom . |

OTHER PUBLICATIONS

Two pages from the Mannesmann Rexroth Sales Brochure, describing DA Hydraulic Control Speed Dependent Variable Displacement Pump AA4VG, Series 3.

*Primary Examiner*—Peter M. Poon
*Attorney, Agent, or Firm*—Paul J. Maginot; Diana L. Charlton

[57] ABSTRACT

A braking apparatus includes a brake cylinder having a first opening and a second opening defined therein. The braking apparatus also includes a movable member located within the brake cylinder which has a channel defined therein. The braking apparatus further includes a brake chamber in fluid communication with the brake cylinder. The brake chamber has a brake member located therein. The movable member is moved to a position which allows fluid communication between the first and second opening through the channel thus creating a subsequent pressure drop in the system. The pressure drop causes a hydrostatic transmission in fluid communication with the brake apparatus to be neutralized by a responsive displacement of a pump and motor which reduces the travel speed of a vehicle. Additionally, the movement of the movable member causes a brake member to be forced against a moving object.

8 Claims, 3 Drawing Sheets

BRAKING APPARATUS AND METHOD FOR USE WITH A MOVING VEHICLE

BACKGROUND OF THE INVENTION

The present invention generally relates to a braking apparatus and method for use with a moving vehicle. The present invention particularly relates to a braking apparatus and method which slows down a moving vehicle by neutralizing an associated hydrostatic transmission prior to actuating a conventional brake system of the vehicle.

Many earth moving machines, such as front end loaders, employ a hydrostatic transmission for propulsion. However, it is also known that operating the hydrostatic transmission in a certain manner can assist in braking or stopping the machine. One such method incorporates an "inching valve" in fluid communication with the hydrostatic transmission. When activated the "inching valve" bleeds off a volume of hydrostatic fluid from the hydrostatic transmission, which in turn causes a temporary reduction in a hydrostatic control pressure of the system. This decrease in control pressure causes an appropriate controller component to "destroke" or neutralize the hydrostatic transmission. A hydrostatic transmission in a "destroked" or neutralized mode delivers a reduced amount of driving force to the vehicles wheels, and thus assists in braking or stopping the vehicle.

One prior art approach to coordinate an "inching valve's" function (and therefore a "destroking" of the hydrostatic transmission) with a conventional braking system of a vehicle has been to mechanically link the "inching valve" to a separate braking element, such as a piston in the master cylinder of a hydraulic braking system. This mechanical linkage allows the "inching valve" to become activated upon actuation of the braking element. However, this approach has the disadvantage of requiring precise tolerances between the parts mechanically interposed between the "inching valve" and the braking element to ensure that the destroking function is initiated before a set of brake pads or shoes engage a disk or drum of the braking system. If the timing is not appropriately set by the mechanical linkage, for example if the "destroking" function occurs at a point in time slightly after actuation of the braking system, the hydrostatic transmission will be operating to propel the vehicle forward at the same time the braking system is attempting to slow down the vehicle. The situation results in excessive brake pad wear and deterioration. An additional disadvantage of utilizing a mechanically linked "inching valve" is that it requires additional parts to link the elements. These additional parts add unnecessary bulk and cost to the braking apparatus of the vehicle.

Therefore, in light of the above discussion, it is apparent that an apparatus and method for coordinating the destroking of a hydrostatic transmission with a conventional braking system is desirable. The present invention provides such an apparatus in the form of an inching valve integrated with a braking element, such as a piston in a hydraulic braking system. One advantage in the present invention is that the timing of the destroking (or neutralization) function is not dependent upon the tolerances of mechanically interposed parts. Moreover, an inching valve integrated with a braking element eliminates the need for mechanical linking elements which add to the cost and bulk of a braking system.

SUMMARY OF THE INVENTION

In accordance with one embodiment of the present invention, there is provided a braking apparatus which includes a brake cylinder having a first opening and a second opening defined therein. The braking apparatus also includes a movable member located within the brake cylinder which has a channel defined therein. The braking apparatus further includes a brake chamber in fluid communication with the brake cylinder, the brake chamber having a brake member located therein.

Pursuant to another embodiment of the present invention, there is provided a method for reducing travel speed of a vehicle. The method includes the steps of (1) providing a brake cylinder having a first opening and a second opening, (2) providing a movable member which is positioned within the brake cylinder, and (3) moving the movable member from a first position to a second position, wherein the movable member (a) prevents fluid communication between the first opening and the second opening while located in the first position, and (b) allows fluid communication between the first opening and the second opening while located in the second position.

According to another embodiment of the present invention, there is provided a braking apparatus which includes a brake cylinder having a first opening and a second opening defined therein, the first opening adapted to allow a flow of fluid to enter the brake cylinder and the second opening adapted to allow the flow of fluid to exit the brake cylinder. The braking apparatus also includes a movable member which (1) prevents fluid communication between the first opening and the second opening when located in a first position, and (2) allows fluid communication between the first opening and the second opening when located in a second position.

According to yet another embodiment of the present invention, there is provided a braking apparatus including a brake cylinder having a first sensing member positioned on a wall thereof. The braking apparatus further includes a movable member located within the brake cylinder, the movable member having a second sensing member positioned thereon. Moreover, the movable member (1) prevents neutralization of a hydrostatic transmission when the first sensing member and the second sensing member are located in a first positional relationship, and (2) causes neutralization of the hydrostatic transmission when the first sensing member and the second sensing member are located in a second positional relationship.

It is therefore an object of the present invention to provide a new and useful braking apparatus.

It is another object of the present invention to provide an improved braking apparatus.

It is still another object of the present invention to provide a new and useful method for reducing the travel speed of a vehicle.

It is also an object of the present invention to provide a braking apparatus and method which has a reduced number of mechanical parts.

It is still another object of the present invention to provide a braking apparatus which has a reduced amount of bulk.

It is yet another object of the present invention to provide a braking apparatus and method which provide for more accurate timing for destroking a hydrostatic transmission and activating a braking system.

It is still another object of the present invention to provide a braking apparatus and method which reduces the wear and deterioration of brake pads or shoes of a braking system.

The above and other objects, features, and advantages of the present invention will become apparent from the following description and attached drawings.

DETAILED DESCRIPTION OF THE PREFERRED EMBODIMENT

Figure 1:
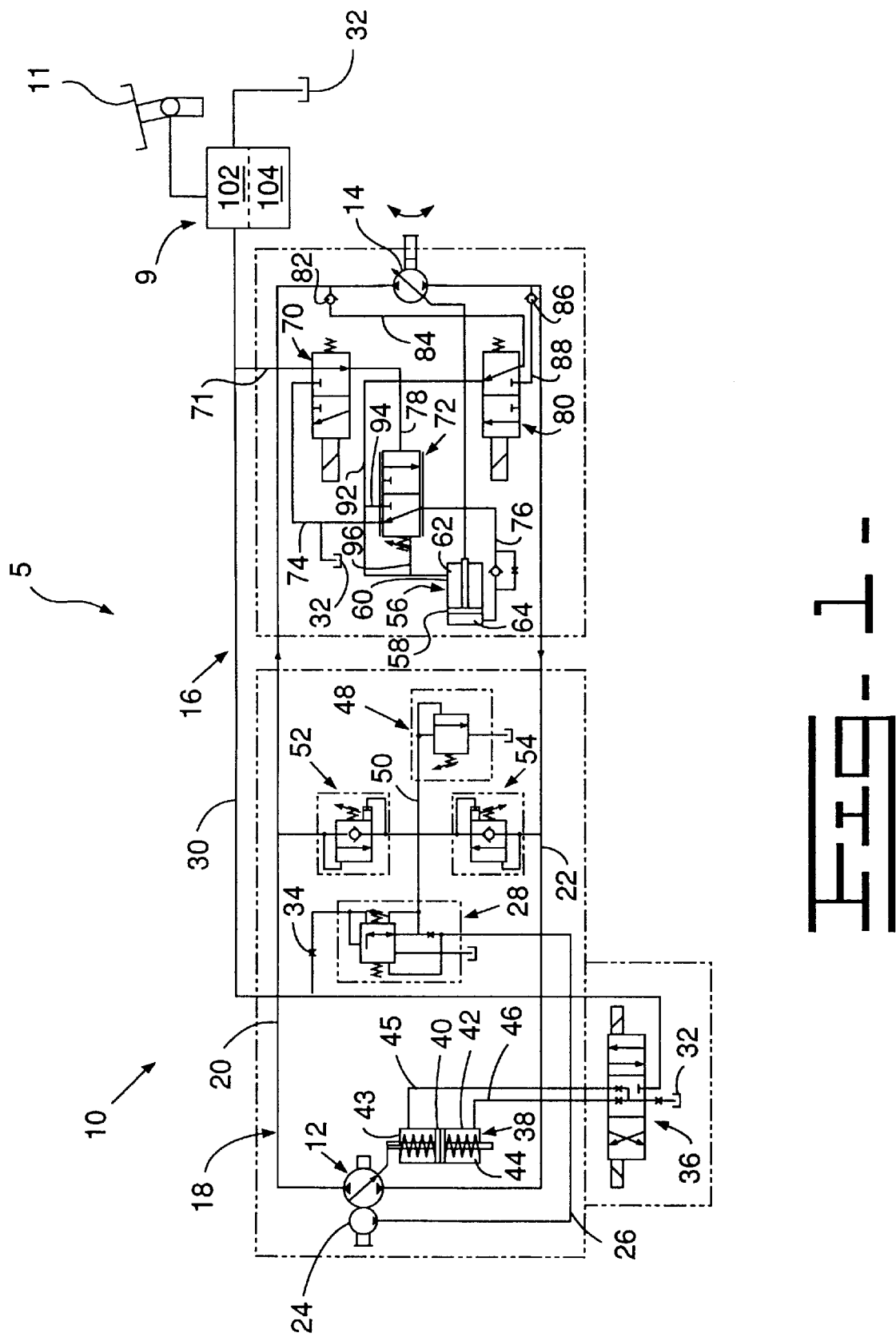
FIG. 1 is a schematic illustration of a braking apparatus of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a schematic illustration of a braking apparatus 5 of the present invention. The braking apparatus 5 includes a hydrostatic transmission 10 and a hydraulic braking system 9. The hydraulic braking system 9 includes an actuating portion 102 (see FIGS. 2 and 3) and a force applying portion 104 (see FIG. 4). A foot pedal 11 is mechanically linked to the actuating portion 102. Moreover, a tank 32 is in fluid communication with the actuating portion 102.

The hydrostatic transmission 10 includes a variable displacement over-center pump 12 and a variable displacement motor 14 fluidly driven by the pump 12. The motor 14 will propel a vehicle (not shown) to a desired speed, in a manner well known in the art. A control circuit 16 is provided for controlling the displacement of the pump 12 and motor 14. It is noted that the hydrostatic transmission could have more than one pump or motor without departing from the braking apparatus of the present invention. A closed loop 18 has a first drive line 20 and a second drive line 22 for fluidly driving the motor 14 by pressurized fluid from the pump 12. An engine driven charge pump 24 supplies fluid to the control circuit 16. A line 26 connects the charge pump 24 to a pressure reducing valve 28. A common pressure control signal line 30 connects the valve 28 to the tank 32 for controlling the displacement of the pump 12 and the motor 14. An orifice 34 is positioned within the signal line 30 and, as is well known, is effective to create a pressure drop thereacross in response to the fluid flow therethrough. A three position directional control valve 36 is connected to the signal line 30 and to a pump displacement controller 38 for changing direction and displacement of the pump 12. The controller 38 includes a piston 40 slidably positioned within a housing 42 and is connected to the pump 12. The housing 42 has a first pressure chamber 43 and a second pressure chamber 44. A line 45 connects the valve 36 to the first pressure chamber 43. A line 46 connects the valve 36 to the second pressure chamber 44. The valve 36 is spring biased to a first centered operative position and movable to a second or third operative position in response to an electrical signal generated in response to the machine controls being moved to one of its forward or reverse operative positions. In the first operative position, fluid flow from signal line 30 is blocked. In the second operative position, the line 45 is in fluid communication with the signal line 30 and the line 46 is in communication with the tank 32. In the third operative position, the line 46 is in fluid communication with the line 30, and the line 45 is in fluid communication with the tank 32. A relief valve 48 is connected to the valve 28 by a line 50. A first relief and replenishing valve 52 is connected between the line 50 and the line 20. A second relief and replenishing valve 54 is connected between the line 50 and the line 22.

A motor displacement controller 56 is provided for changing the displacement of the motor 14. The motor controller 56 includes a piston 58 slidably positioned within a housing 60 and connected to the motor 14. The housing 60 has a first pressure chamber 62 and a second pressure chamber 64. A solenoid operated valve 70 is connected to the signal line 30 by a line 71. An infinitely positionable pilot operated valve 72 is connected to the first solenoid valve 70 and the tank 32 by a line 74 and to the second pressure chamber 64 of the controller 56 by a line 76. The valve 70 is connected to one end of the valve 72 by a line 78. A solenoid operated valve 80 is connected through a check valve 82 to the drive line 20 by a line 84 and connected through a check valve 86 to the drive line 22 by a line 88. The solenoid operated valve 80 is connected to the controller 56 by a line 92 and connected to the valve 72 by the line 92 and a line 94. A line 96 connects the line 92 to the other end of the valve 72. The solenoid operated valve 70 is a two-position valve spring biased to a first operative position at which the line 71 is in fluid communication with the line 78 and moveable in response to an electric signal to its second operative position at which the line 78 is in fluid communication with the tank 32 through the line 74. The pilot operated valve 72 is a spring biased two-position valve moveable from its first spring biased position at which the line 76 is in fluid communication with the tank 32 through the line 74 towards its second operative position at which the line 94 is in fluid communication with the line 76. The pilot operated valve 72 is moveable toward its second position in response to a pressure signal in line 78. The solenoid operated valve 80 is a two-position valve spring biased to a first operative position at which the line 94 is in fluid communication with the line 92 and moveable to its second operative position at which the line 88 is in fluid communication with the line 82. The solenoid operated valve 80 is movable to its second operative position in response to an electrical signal generated in response to the machine controls being moved to one of its forward or reverse operative positions.

Figure 2:
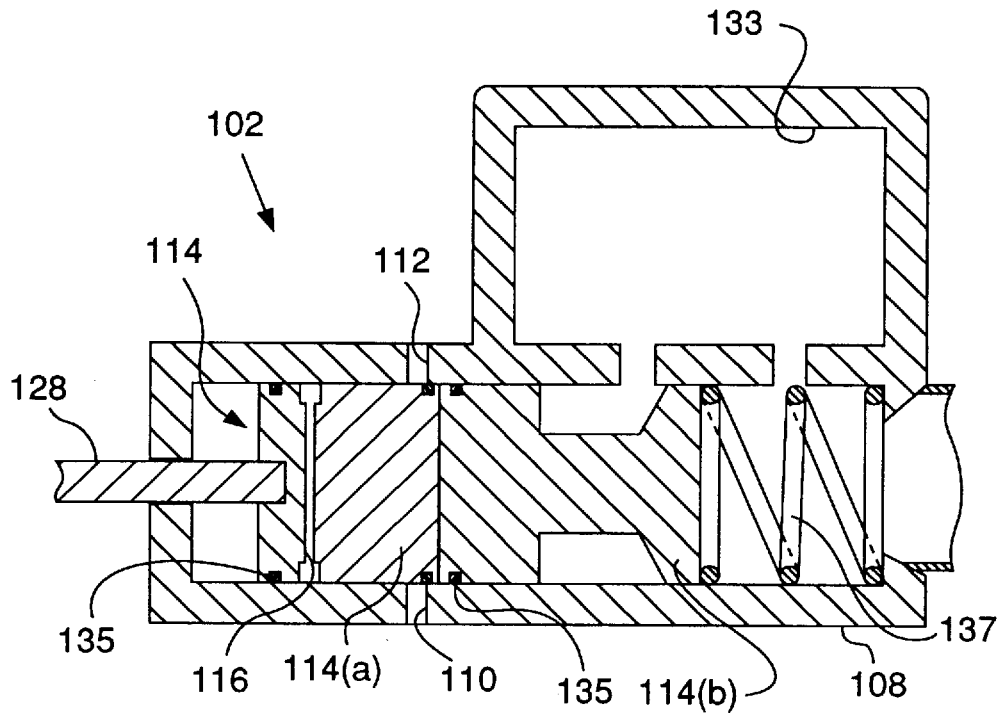
FIG. 2 is a cross-sectional view of the brake cylinder and piston of an actuating portion of a hydraulic brake system of the brake apparatus of FIG. 1, with the piston shown located in a first position.
Figure 3:
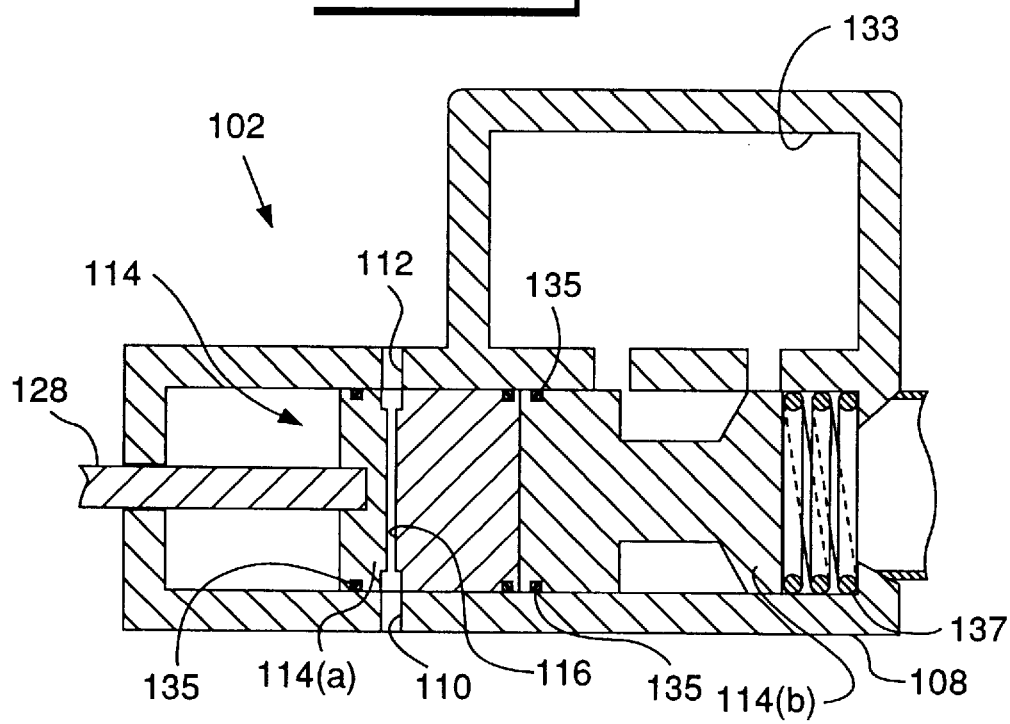
FIG. 3 is a view similar to FIG. 2, but with the piston shown located in a second position.

Referring now to FIGS. 2 and 3, the actuating portion 102 of the hydraulic braking system 9 includes a brake cylinder 108 having a first opening 110 and a second opening 112 defined therein. The brake cylinder 108 also has a brake fluid reservoir 133 attached thereto. The first opening 110 is in fluid communication with the signal line 30 of the hydrostatic transmission 10. The first opening 110 is adapted to allow fluid to enter the brake cylinder 108. The second opening 112 is in fluid communication with the tank 32. The second opening 112 is adapted to allow fluid to exit the brake cylinder 108. A piston 114 is positioned within the brake cylinder 108. Piston 114 is shown as having a first stage 114(a) and a second stage 114(b), however it should be understood that a single stage piston can also be used in the present invention. The piston 114 has a channel 116 defined therein which extends therethrough in a width-wise direction as shown in FIGS. 2 and 3. The piston 114 further includes three grooves which extend around the periphery of the piston as shown in FIGS. 2 and 3. Three sealing rings 135 are respectively positioned within the three grooves so as to prevent leakage of fluid out of the brake cylinder 108. The piston 114 is mechanically connected to a foot pedal 11 (not shown in FIGS. 2 and 3) via a rod 128. Actuation of the foot pedal 11 causes the piston 114 to move from a first position as shown in FIG. 2 to a second position as shown in FIG. 3.

When located in the first position (see FIG. 2), the piston 114 prevents fluid communication between the first opening 110 and the second opening 112. When the piston 114 is located in the second position (see FIG. 3), fluid communication is allowed between the first opening 110 and the second opening 112 through the channel 116.

Figure 4:
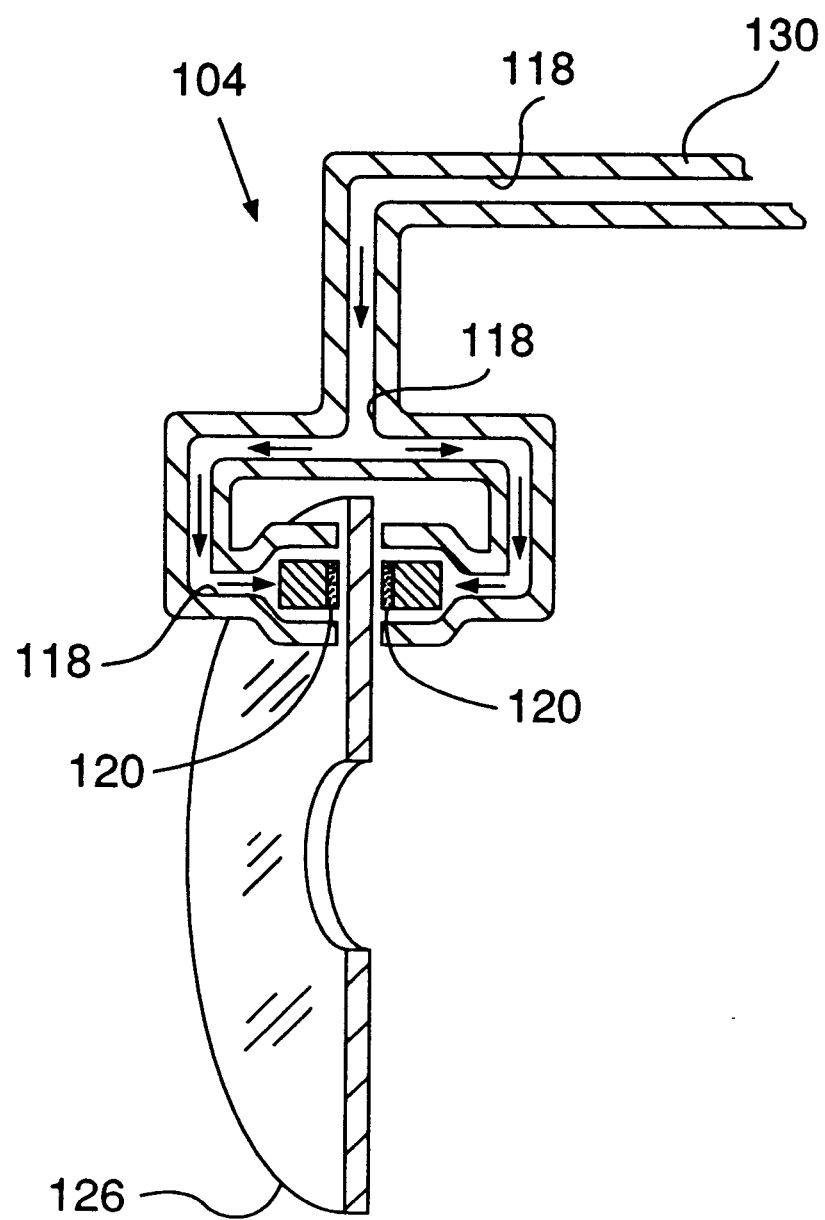
FIG. 4. is a cross-sectional view of a force applying portion of the hydraulic braking system of the brake apparatus of FIG. 1.

Referring now to FIG. 4, the force applying portion 104 of the hydraulic braking system 9 includes a conduit 130 which defines a brake chamber 118. A pair of brake pads 120 are movably mounted within the brake chamber 118. The brake chamber 118 is in fluid communication with the brake cylinder 108. The force applying portion 104 further includes a brake disk 126 against which the pair of brake pads 120 may be forced.

Actuation of the foot pedal 11 causes movement of the piston 114 from the first position as shown in FIG. 2 to the second position as shown in FIG. 3. As a result of the movement of the piston 114 in the above-described manner, fluid pressure within the brake chamber 118 increases so that the pair of brake pads 120 are forced against the brake disk 126. The brake disk 126 is linked to a wheel (not shown) of the vehicle (not shown) in a conventional manner. In operation, forcing the brake pads 120 against the brake disk 126 will reduce the travel speed of the vehicle (not shown).

When an operator is not applying force to the foot pedal 11, the piston 114 is normally biased by a spring 137 so as to maintain the piston 114 in the first position (see FIG. 2). So positioned, the signal line 30 is prevented from being in fluid communication with the tank 32.

The piston 114 is moved to the second position (see FIG. 3) in response to the application of force to the foot pedal 11 by an operator. With the piston 114 located in the second position, the signal line 30 is allowed to be in fluid communication with the tank 32.

During operation of the braking apparatus 5, the pump 12 supplies fluid flow to the motor 14, in a well known manner, for propelling the machine at a preselected travel speed. The pump 12 will supply fluid flow to the motor 14 through line 20. Fluid will be returned to the pump 12 through line 22 in one direction of operation. Fluid flow will be reversed in another direction of operation of the pump 12. The degree of operator input will determine the rate of speed.

When the foot pedal 11 is depressed, piston 114 is moved from its first position (see FIG. 2) to its second position (see FIG. 3) thereby allowing fluid communication between the signal line 30 and the tank 32 through channel 116. This causes fluid from the signal line 30 to enter the tank 32 thus creating a pressure drop in the signal line 30 downstream of the orifice 34. This reduction of the pressure in the signal line 30 causes the hydrostatic transmission to be destroked (or neutralized). In particular, this reduction moves the controller 38 to decrease the displacement of the pump 12 thus decreasing fluid and effectively allows the valve 72 to move to its first position thus moving the controller 56 to increase the displacement of the motor to slow the speed of the machine.

Movement of piston 114, due to force being applied to the foot pedal 11, from its first position (see FIG. 2) to its second position (see FIG. 3) provides two functions. Firstly, it causes destroking (or neutralization) of the hydrostatic transmission 10 as described above. Secondly, it causes the pair of brake pads 120 to be forced against the brake disk 126, also as described above.

An important aspect of the present invention is that the channel 116 becomes aligned with the first and second openings 110, 112 during movement of the piston 114 within the brake chamber 108 prior to the brake pads 120 being forced against the brake disk 126 due to an increase in fluid pressure in the brake chamber 118. This is important because this will ensure that neutralization of the hydrostatic transmission 10 occurs at a point in time prior to the brake pads 120 being forced against the brake disk 126. Consequently, this will prevent the hydrostatic transmission 10 for operating to propel the vehicle forward at the same time the braking system 9 is attempting to slow down the speed of the vehicle. Accordingly, excessive wear and deterioration of the brake pads will be prevented.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, while the braking apparatus of the present invention has been described as having a brake cylinder which includes a first and second opening defined therein which cooperates with a channel defined in the piston in order to coordinate the destroking of the hydrostatic transmission with the actuation of the piston, other arrangements are contemplated. One such arrangement would include a first sensor integrated into the piston 114 and a second sensor integrated into a wall of the brake cylinder 108. A solenoid could be provided which would remain inactivated when the first sensor and the second sensor are spaced apart from each other by an operatively significant distance. Then, when the first sensor and the second sensor become positioned close in proximity to each other (e.g. positioned adjacent to each other) by movement of the piston 114 within the brake cylinder 108, the solenoid could be activated. Activation of the solenoid could cause a valve to be opened which would allow the hydrostatic transmission to bleed off pressure from the signal line thereby causing the hydrostatic transmission to be destroked in a manner similar to that hereinbefore described.

Moreover, it should be appreciated that while the braking apparatus of the present invention has been described as utilizing a decrease in hydrostatic pressure to signal the hydrostatic transmission to destroke itself, it is also possible that an increase in hydrostatic pressure could be utilized to signal the hydrostatic transmission to destroke itself.

Additionally, while the braking apparatus of the present invention has been described as having an actuating portion which includes a straight bore master cylinder, the actuating portion may alternatively utilize another type of brake cylinder such as a power cylinder, or power brake valve.

In addition, while the braking apparatus of the present invention has been described as having a force applying portion which utilizes a disk brake arrangement, the force applying portion may alternatively utilize another arrangement such as a drum brake arrangement.

What is claimed is:

1. A braking apparatus, comprising:
   a brake cylinder having a first opening in fluid communication with a signal line of a hydrostatic transmission and a second opening in fluid communication with a tank defined therein, said first opening adapted to allow a flow of fluid to enter said brake cylinder and said second opening adapted to allow the flow of fluid to exit said brake cylinder;

a brake chamber in fluid communication with said brake cylinder; said brake chamber having a brake member located therein; and a movable member positioned within said cylinder which (1) prevents fluid communication between the first opening and the second opening when located in a first position, and (2) allows fluid communication between the first opening and the second opening when located in a second position, wherein said movement of said movable member from the first position to the second position fluidly communicates said signal line with said tank to neutralize said hydrostatic transmission and raises the fluid pressure within said brake chamber to force said brake member against a moving object.

2. The braking apparatus of claim 1, wherein:

said brake member is a brake pad, said moving object is a brake disk, and said movable member is a piston.

3. The braking apparatus of claim 1, wherein:

movement of said movable member from the first position to the second position raises the fluid pressure within the brake chamber after neutralization of said hydrostatic transmission.

4. The braking apparatus of claim 1, wherein said movable member has a channel defined therein which aligns with the first opening and the second opening so as to enable the flow of fluid to traverse the channel when said movable member is located in the second position.

5. A method for reducing travel speed of a vehicle, comprising the steps of:

providing a brake cylinder having a first opening in fluid communication with a signal line of a hydrostatic transmission and a second opening in fluid communication with a tank;

providing a movable member which is positioned within the brake cylinder;

providing a brake chamber in fluid communication with the brake cylinder;

providing a brake member positioned within the brake chamber; and moving the movable member from a first position to a second position, wherein the movable member (1) prevents fluid communication between the first opening and the second opening while located in the first position, and (2) allows fluid communication between the first opening and the second opening while located in the second position to raise the fluid pressure within the brake chamber so as to force the brake member against a moving object and to place the signal line in fluid communication with the tank so as to neutralize the hydrostatic transmission.

6. The method of claim 5 wherein:

the movable member has a channel defined therein, and the moving step further includes the step of aligning the channel with the first opening and second opening so as to place the first opening in fluid communication with the second opening thereby enabling a flow of fluid to traverse the channel when the movable member is located in the second position.

7. A method of modifying an existing braking apparatus for a vehicle having a hydrostatic transmission, said braking apparatus including a brake cylinder, a piston positioned within the brake cylinder, a brake chamber in fluid communication with the brake cylinder, a brake pad and a brake disk located within the brake chamber, comprising the steps of:

providing first and second openings on the brake cylinder;

providing a channel on the piston; and moving the piston from a first position which prevents fluid communication between the first and second openings to a second position which allows fluid communication between the first and second openings through the piston channel to neutralize the hydrostatic transmission.

8. The method of modifying an existing braking apparatus of claim 7 wherein the moving step includes the step of:

raising the fluid pressure within the brake chamber in a preselected timed relationship to the neutralization of the hydrostatic transmission so as to force the brake pad against the brake disk.

* * * * *